US008831756B2

(12) United States Patent
Gerstmaier et al.

(10) Patent No.: US 8,831,756 B2
(45) Date of Patent: Sep. 9, 2014

(54) CONTROL SYSTEM OF A TECHNICAL INSTALLATION

(75) Inventors: Alexej Gerstmaier, Rheinstetten (DE);
Eberhard Schlarb, Gundelfingen (DE);
Guido Steinhauer, Büchelberg (DE)

(73) Assignee: Siemens Aktiengesellschaft, Munich (DE)

( * ) Notice: Subject to any disclaimer, the term of this patent is extended or adjusted under 35 U.S.C. 154(b) by 908 days.

(21) Appl. No.: 12/527,256

(22) PCT Filed: Feb. 14, 2008

(86) PCT No.: PCT/EP2008/051820
§ 371 (c)(1),
(2), (4) Date: Aug. 14, 2009

(87) PCT Pub. No.: WO2008/098999
PCT Pub. Date: Aug. 21, 2008

(65) Prior Publication Data
US 2009/0326683 A1     Dec. 31, 2009

(30) Foreign Application Priority Data
Feb. 15, 2007   (DE) .......................... 10 2007 007 537

(51) Int. Cl.
G05B 9/02         (2006.01)
G05B 19/042       (2006.01)
G05B 9/03         (2006.01)

(52) U.S. Cl.
CPC ........ *G05B 9/03* (2013.01); *G05B 2219/25153* (2013.01); *G05B 2219/25157* (2013.01); *G05B 19/0428* (2013.01); *G05B 2219/24196* (2013.01); *G05B 2219/24173* (2013.01)
USPC ........................................... 700/78; 700/287

(58) Field of Classification Search
USPC ................................ 700/79, 81, 286, 287, 78
See application file for complete search history.

(56) References Cited

U.S. PATENT DOCUMENTS

| 6,658,850 | B1 * | 12/2003 | Travaly et al. ................... 60/646 |
| 7,460,865 | B2 | 12/2008 | Nixon et al. |
| 2005/0071725 | A1 * | 3/2005 | Gibart ........................... 714/755 |
| 2005/0273689 | A1 | 12/2005 | Barthel et al. |
| 2006/0111794 | A1 | 5/2006 | Wysuph et al. |
| 2006/0224357 | A1 | 10/2006 | Taware et al. |
| 2007/0180286 | A1 * | 8/2007 | Oster et al. ........................ 714/2 |
| 2008/0013569 | A1 * | 1/2008 | Boren ............................ 370/466 |
| 2008/0215759 | A1 | 9/2008 | Maniwa et al. |

FOREIGN PATENT DOCUMENTS

| DE | 102004029022 A1 | 2/2005 |
| DE | 102004008251 A1 | 9/2005 |
| DE | 102005054932 A1 | 6/2006 |
| EP | 1596517 A1 | 11/2005 |
| EP | 1857936 A1 | 11/2007 |
| WO | WO 2006080431 A1 | 8/2006 |

* cited by examiner

*Primary Examiner* — Mohammad Ali
*Assistant Examiner* — Nathan Laughlin

(57) ABSTRACT

A control system of a technical installation including at least one field device which makes available at least two redundant protocol values that are converted by the control system into a single non-redundant functional value is provided. The control system is provided with at least two redundant communication channels for converting the at least two redundant protocol values, the channels controlling the respective protocol value with respect to its exactitude and transmitting an exact protocol value.

16 Claims, 1 Drawing Sheet

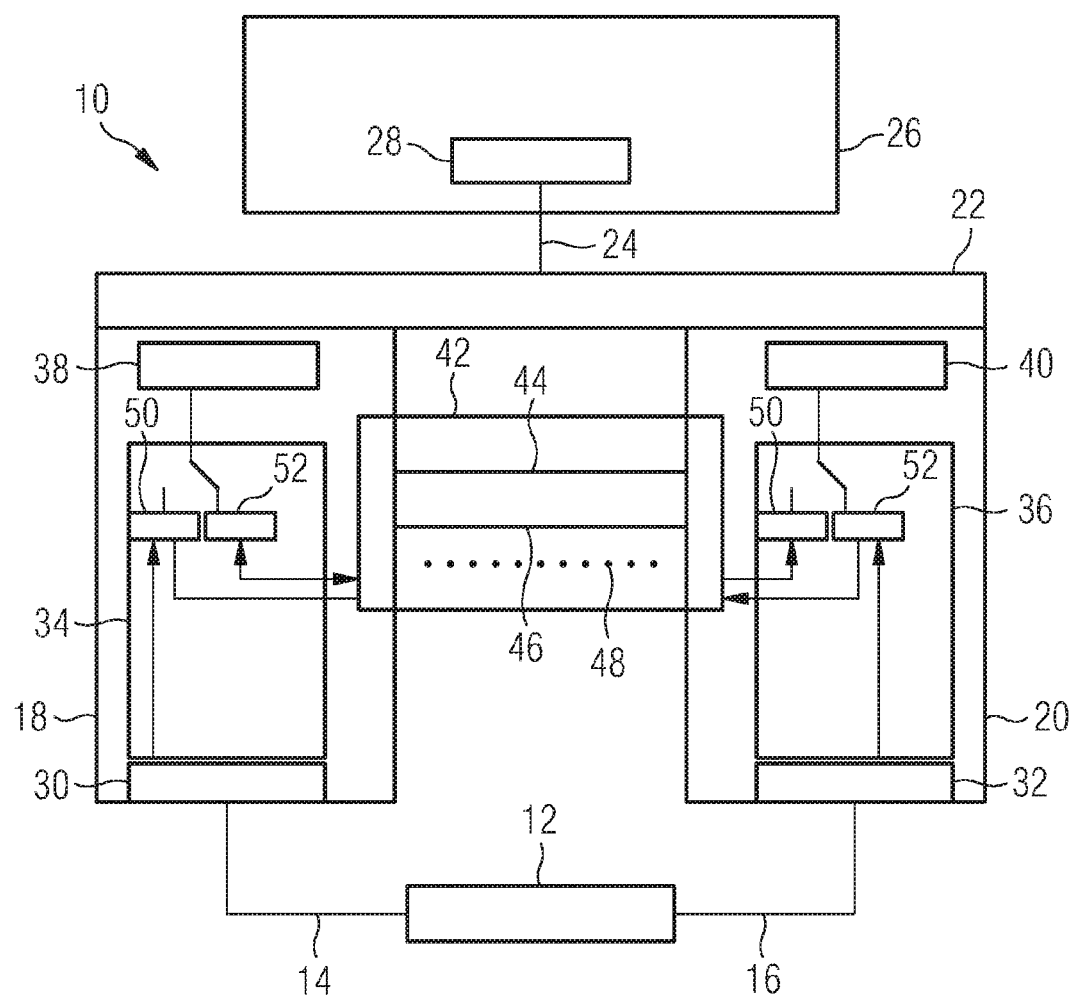

CONTROL SYSTEM OF A TECHNICAL INSTALLATION

CROSS REFERENCE TO RELATED APPLICATIONS

This application is the US National Stage of International Application No. PCT/EP2008/051820 filed Feb. 14, 2008 and claims the benefit thereof. The International Application claims the benefits of German Patent Application No. 10 2007 007 537.7 DE filed Feb. 15, 2007; both of the applications are incorporated by reference herein in their entirety.

FIELD OF INVENTION

The invention relates to a control system of a technical installation comprising at least one field device which makes available at least two redundant protocol values that are converted by the control system into a single non-redundant functional value.

BACKGROUND OF INVENTION

With control systems of technical installations, like for instance power plants, turbines or generic engines, it is in many cases necessary, due to operational reliability, to redundantly couple the protocols made available by the respective field devices. The majority of protocols of field devices nevertheless do not support a redundant coupling so that a unique communication link has to be configured for the coupling in each instance.

With the previous configuration, the protocol values are read into a target system by way of two independent communication links, said target system being provided with a specially adjusted selection logic. The selection logic determines the correct protocol value in each instance, faulty protocol values are however eliminated. Configuring this selection logic for each individual case is associated with a high outlay and is also error prone.

SUMMARY OF INVENTION

It is an object of the invention to improve a control system of the type mentioned in the introduction such that the aforecited disadvantages are overcome and in particular control systems of this type can be created in a more cost-effective fashion.

The object is achieved in accordance with the invention by a control system according to the independent claim. Advantageous developments of the invention are described in the dependent claims.

According to the invention, a control system of a technical installation comprising at least one field device which makes available at least two redundant protocol values that are converted by the control system into a single non-redundant functional value is created, in which at least two redundant communication channels are provided for converting the at least two redundant protocol values, by means of which the respective protocol value is controlled with respect to its exactitude and can transmit a protocol value that is considered to be exact.

In other words, in accordance with the invention, the exactitude of the protocol values is redundantly controlled in two communication channels and the control is also shifted onto a level below the actual target system and/or the actual data processing.

The inventive solution is in this way advantageous such that overall the control offers increased reliability and can at the same time be made available and operated more easily. The control is carried out at least twice on the basis of the redundant embodiment and is also realized in an actual software layer, which is specially adjusted to the control requirements and can then be used repeatedly irrespective of the target system. Furthermore, the basis is provided with the inventive solution in order in particular to be able to realize more quickly and cost-effectively the coupling of the communication channels to the field device as well as to the target system. This similar basic advantage is described in more detail below.

With an advantageous development of the control system according to the invention, the at least two redundant communication channels each include a driver logic, by means of which the respective protocol value, based on a signal of the field device, can be made available as a standardized value. The driver logics are in particular used inventively in order to achieve standardized process images, which, subsequently in respect of the correct and incorrect values contained therein, can be controlled using a likewise standardized control software.

The inventive at least two redundant communication channels also advantageously include an assessment logic in each instance, by means of which the protocol value can be assessed with respect to its exactitude. In accordance with the invention, this assessment logic is essentially identical or similar particularly due to the standardized process images for all applications. Considerable cost savings are possible during the provision and operation of such assessment logics. No logic which was additionally projected for the target system needs to be provided for the selection of values, as was previously the case. The assessment logic is provided particularly advantageously in the form of a protocol assessment plug-in for the associated communication channel. With this and the other solutions discussed here, the communication channel is configured advantageously on the basis of a personal computer (PC).

Alternatively or in addition, the at least two redundant communication channels advantageously have a function logic in each instance, by means of which the respective protocol value that is considered to be exact can be processed to form a functional value. The communication channels therefore assume additional processing tasks so that an adjusted, in particular standardized data provision can also take place overall in respect of the protocols of connected terminals for the target system.

It is particularly preferred as an additional advantageous embodiment of the solution according to the invention for the at least two redundant communication channels to be coupled to one another using a connecting channel, by means of which the redundant protocol values can be exchanged alternately between the communication channels. In this way, each of the communication channels is provided with a set comprising two protocol values, so that these can perform a correspondingly educated control in respect of correct and incorrect protocol values on this basis.

Furthermore, the said connecting channel is itself embodied particularly preferably to be redundant. Several parallel connecting lines can be provided as redundancy for the connecting channel for instance. The reliability of the aforedescribed exchange of protocol values between the communication channels is increased significantly as a result.

To further reduce the outlay involved during processing of the protocol values, in accordance with the invention, the redundant protocol values are preferably alternately exchanged as standardized values by means of the connecting channel.

As a further advantageous embodiment, provision is made in accordance with the invention for a masking logic in the control system, by means of which the redundant protocol values considered to be exact, which have been processed in particular to form redundant functional values, are combined to form a single protocol value and/or functional value. This protocol value and/or functional value are/are then provided for the respective target system, which is for instance a configuration interface. The target system nevertheless does not observe the redundant protocol processing and also does not need to be adjusted hereto. The masking logic provided therefrom masks the redundancy from below.

Furthermore, it is inventively preferred if the redundant protocol values which are considered to be exact, which have been further processed in particular to form redundant functional values, can be compared by means of the comparison logic for consistency. The comparison of the protocol values which are considered to be exact can identify if an unwanted deviation or a fault results in the redundant protocol processing. The inventive protocol processing then underlies an additional quality assurance.

BRIEF DESCRIPTION OF THE DRAWINGS

An exemplary embodiment of an inventive control system is described in more detail below with reference to the appended schematic drawing:

FIG. 1 shows a block diagram of an inventive control system with a field device connected thereto.

DETAILED DESCRIPTION OF INVENTION

FIG. 1 shows a control system 10, to which field device 12 is connected. The field device 12 is for instance a turbine or a generator of a power plant. The field device 12 is connected to a first communication channel 18 and/or a second communication channel 20 by means of a first line 14 and a second line 16. The communication channels 18 and 20 are embodied in the form of a computer module and are provided so as to control individual protocol values of a protocol provided redundantly by the field device 12 in respect of its exactitude in each instance.

The protocol values considered to be exact are transmitted by the communication channels 18 and 20 to a masking logic 22, which conveys these via a line 24 to a target system 26. The target system 26 is a configuration interface for the protocol values for instance.

Each individual communication channel 18 and 20 includes a driver logic 30 and/or 32, by means of which the values provided by the field device 12 are converted into standardized protocol values, for instance in accordance with the profibus standard or the INC standard. The converted values are also processed by an assessment logic 34 and/or 36. This assessment logic 34 and/or 36 is embodied in each instance in the form of a largely always identical protocol assessment plug-in, which assesses the protocol values processed therein in respect of their exactitude. The assessment logic 34 and/or 36 is therefore largely identical and/or similar irrespective of the special application situation of the field device 12.

The protocol values assessed to be exact are transmitted to a function logic 38 and/or 40, which are each embodied in the form of a computer assembly of the respective communication channel 18 and/or 20 and which process protocol values which are considered to be exact to form functional values. The functional values of the two communication channels 18 and 20 are then compared with one another by means of a comparison logic within the masking logic 22. They must be identical if the redundant protocol processing has operated correctly up until this step. The correct functional values accordingly reach the target system 26, which has incidentally ignored the redundant protocol processing.

In order to assess the exactitude of the standardized protocol values with the aid of the assessment logics 34 and/or 36, provision is also made for the protocol values of the one communication channel 18 to be exchanged with those of the other communication channel 20. To this end, a connecting channel 42 is embodied between the communication channels 18 and 20. This connecting channel 42 is configured with redundant connecting lines 44, 46 and 48. A first protocol image 50 and a second protocol image 52 is obtained in this way in each of the two communication channels 18 and 20. The two protocol images 50 and 52 can then be assessed in each instance and the correct protocol values can then be transmitted. During this assessment, the two assessment logics 34 and/or 36 are to achieve the same result, so that, as described above, the same functional values are subsequently to be obtained in the two communication channels 18 and 20.

The invention claimed is:

1. A control system of a technical installation, comprising:
   a field device configured to provide two redundant protocol values; and
   two redundant communication channels for converting the two redundant protocol values into a single non-redundant functional value,
   wherein each communication channel comprises assessment logic and function logic,
   wherein each assessment logic assesses one of the two redundant protocol values with respect to a correctness of the redundant protocol value,
   wherein a correct redundant protocol value is transmitted to the function logic of the respective communication channel, wherein two correct redundant protocol values are converted into the single non-redundant functional value.

2. The control system as claimed in claim 1, wherein the two redundant communication channels each comprise a driver logic, and wherein each redundant protocol value is provided as standardized value by the driver logic based upon a signal of the field device.

3. The control system as claimed in claim 1, further comprising:
   a connecting channel, wherein the two redundant communication channels are coupled to one another by the connecting channel, and wherein the redundant protocol values are exchanged alternately between the two redundant communication channels via the connecting channel.

4. The control system as claimed in claim 3, wherein the connecting channel is configured redundantly.

5. The control system as claimed in claim 3, wherein the redundant protocol values are exchanged alternately as standardized values via the connecting channel.

6. The control system as claimed in claim 1, further comprising:
   a masking logic configured to combine the functional values to form the single non-redundant functional value.

7. The control system as claimed in claim 6, further comprising:
   a comparison logic configured to compare the functional values for consistency.

8. The control system as claimed in claim 7, wherein the comparison logic is integrated in the masking logic.

9. The control system as claimed in claim 1, wherein the field device is a turbine or a generator of a power plant.

10. A method of operating a control system of a technical installation, comprising:
providing two redundant protocol values by a field device;
providing two redundant communication channels, wherein each communication channel comprises assessment logic and function logic;
assessing, by the assessment logics, the two redundant protocol values whether the protocol values are correct;
transmitting correct redundant protocol values from the assessment logics to the function logics; and
converting the correct redundant protocol values into a single non-redundant functional value by the function logic.

11. The method as claimed in claim 10, further comprising:
providing the redundant protocol values as standardized values by driver logics, each communication channel including one driver logic, wherein the redundant protocol values are provided as standardized values based upon a signal of the field device.

12. The method as claimed in claim 10, further comprising:
coupling the two redundant communication channels to one another by a connecting channel, wherein the redundant protocol values are exchanged alternately between the two redundant communication channels via the connecting channel.

13. The method as claimed in claim 12, wherein the connecting channel is configured redundantly.

14. The method as claimed in claim 12, further comprising:
exchanging alternately the redundant protocol values as standardized values via the connecting channel.

15. The method as claimed in claim 10, further comprising:
combining the functional values by a masking logic to form the single non-redundant functional value.

16. The control system as claimed in claim 15, further comprising:
comparing the functional values for consistency by a comparison logic.

* * * * *